INVENTORS
JAN A. RAJCHMAN &
RAYMOND STUART-WILLIAMS
BY Morris L. Rabkin
ATTORNEY Oct. 5, 1954 J. A. RAJCHMAN ET AL 2,691,153

MAGNETIC SWITCHING SYSTEM

Filed Jan. 13, 1953 3 Sheets-Sheet 2

INVENTORS

JAN A. RAJCHMAN &

RAYMOND STUART-WILLIAMS

BY Morris A. Rabkin

ATTORNEY

/= A TURNS IN P DIRECTION
\= A TURNS IN N DIRECTION

INVENTORS
JAN A. RAJCHMAN &
RAYMOND STUART-WILLIAMS
BY Morris Rabkin
ATTORNEY

Patented Oct. 5, 1954

2,691,153

UNITED STATES PATENT OFFICE 2,691,153

MAGNETIC SWITCHING SYSTEM

Jan A. Rajchman and Raymond Stuart-Williams, Princeton, N. J., assignors to Radio Corporation of America, a corporation of Delaware Application January 13, 1953, Serial No. 331,095

14 Claims. (Cl. 340—166)

This invention relates to switching devices and more particularly to an improvement in magnetic switching and translating systems.

In applications where a minimum maintenance and a minimum replacement of parts is an absolute essential, in view of the location or complexities of the utilizing system, magnetic switches or commutating systems are beginning to find extensive applications. It will be readily appreciated that magnetic switches, of the type intended herein, do not wear out and, in view of the advances made in the composition of the magnetic materials used in the switches, the size of the magnetic switching elements is so reduced that a considerable space saving is made.

Figure 3:
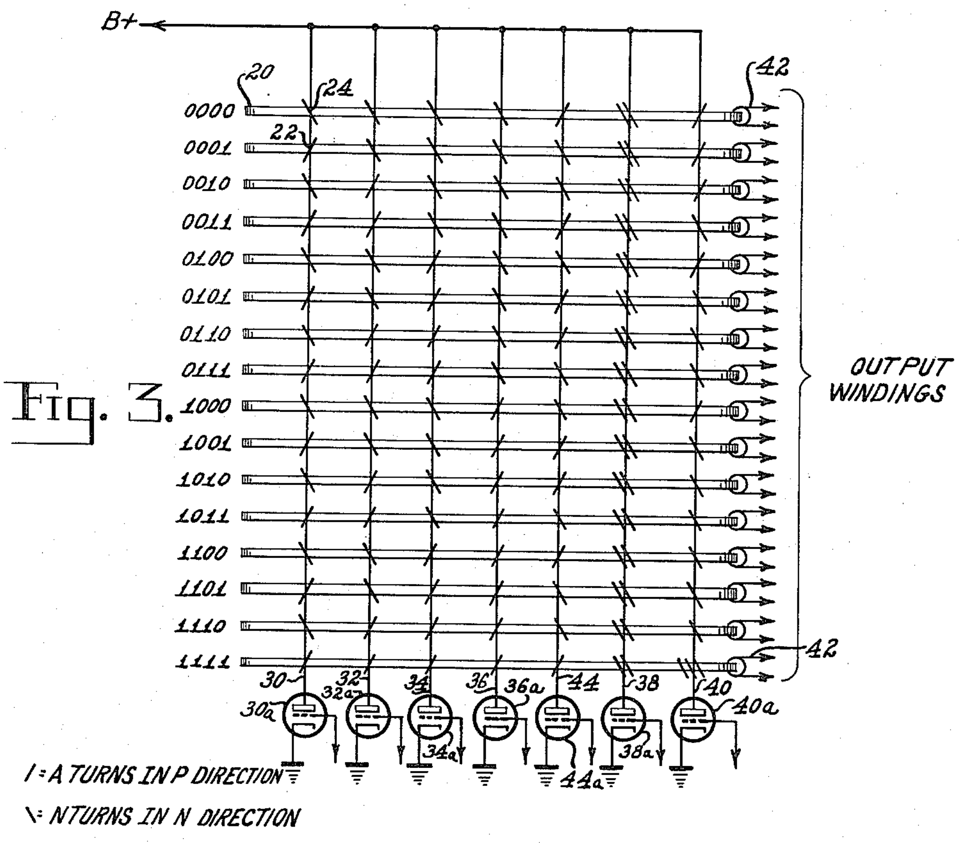

In an article in the RCA Review for June, 1952, entitled, "Static Magnetic Matrix Memory and Switching Circuits," a magnetic switch is described and shown by Jan A. Rajchman, one of the co-inventors herein. There is also shown its application for driving a magnetic matrix memory. The magnetic switch described consists of a number of toroidal cores of magnetic material, preferably having a substantially rectangular hysteresis loop. Coils are inductively coupled to each of the cores in accordance with a desired code. The coils may be considered as being grouped into pairs, and, as shown in Fig. 3 of the article, each pair of coils represents an order in a binary number. The magnetic cores each have a different, three-digit or order, binary number assigned thereto. These correspond to the three orders of the coil pairs. Each of the coils is coupled to each of the cores by a winding. A winding may be said to have a P or an N sense, depending upon the direction of the turns. If it is assumed that the sense of the windings of a pair of coils be in one order, (N–P) to represent a one, and in the opposite order, (P–N) to represent a zero, then the windings of each of the pairs of coils may be arranged on a core to represent the number assigned to that core. Thus a winding arrangement N–P, N–P, N–P, for the three pairs of coils, is found on core 111. All the cores are usually saturated in one polarity. To assure this, a coil having only N going windings is coupled to all the cores. When current is drawn through this coil, it drives all the cores to magnetic saturation in a direction N. If it is desired to select a particular core and drive it to magnetic saturation in the opposite polarity (P), exciting currents are applied to one coil in each pair of coils which has P sense windings on the selected core. It will be found that by reason of the winding code adopted, a "0" digit in each one of the coil orders always requires excitation of the same one of the coil pairs. This can be designated as the "zero" coil for each order. A "one" digit in each coil order always requires excitation of the other coil in a pair. This can be designated as the "one" coil for each order. Thus a particular core may be selected by addressing the coil pairs using the information provided by the core number. For a given coil excitation pattern, only one selected core in the switch will have only the windings which provide P driving magnetomotive forces excited. All the other cores will have one or more windings excited with N driving magnetomotive forces. Accordingly, only the selected core receives a sufficient magnetomotive force to drive it to magnetic saturation in the opposite polarity. The other cores do not receive such a force. Further details of the connections and operation of this switch, amongst others, may be found described and claimed in an application Serial No. 275,622, filed March 8, 1952, by J. A. Rajchman, for "Magnetic Matrix and Computing Devices."

In the noted application, in addition to the form of the switch described above, other forms are shown wherein other codal systems for placing the coil windings upon the cores are employed. For example, in Fig. 7 of the application is shown a drawing wherein a single P going coil is connected in series with a number of pairs of N going coils. Selection of a core is made by excitation of one or the other of these pairs. Only one core will receive a drive from the P going coil exclusively. The other cores receive N drives in addition to the P drive. In another system, one pair of coils has P driving windings coupled to different halves of the magnetic switch. The remaining pairs of coils are coupled to the cores of the magnetic switch by N driving windings. Selection of a core to be driven to condition P is obtained by driving one coil in the first pair which includes a winding on the desired core and selecting one coil in each of the remaining pairs so that the desired core is the only one receiving only magnetomotive forces in the P direction. Still another form of switch is described in this application. This is one where the selecting coils only have P driving windings by means of which they are coupled to the cores in accordance with the desired code. A core selection is made by exciting those coils which are coupled to the selected core. The core requires a magnetomotive force to turn it over, which is the sum of the magnetomotive forces provided by the P driving windings which are wound on it. Less than all of this magnetomotive force is insufficient to drive the core from saturation in condition N to saturation in condition P.

The magnetic switches briefly described above all, with the exception of the last one, are driven by coil pairs. One or the other of each of the coils in a pair must be driven for selection. The structure of the last type of switch, which employs only P going coil windings, to a certain extent gets away from the concept of applying a drive to a coil in a pair dependent on whether a one or a zero is called for from such coil pair. However, the shortcoming of this particular switch is that selection is done upon an amplitude basis, with P going magnetomotive forces being provided to a number of other cores in the switch. Although these other P going forces are of lesser amplitude than that required for turnover, they still cause some variation in the magnetic condition of these non-selected cores and can produce an output as a result of the magnetic excursion through which they are driven. This latter condition arises as a result of the finite slope which does exist in the saturated regions of the magnetic core material available today.

Although this type of reaction does not eliminate such a switch from consideration, it does warrant some "unwanted signal" cancelling apparatus either in the output of the switch or within the switch structure itself. One such system will be found described in the aforementioned application.

One of the advantages of using coils having both N and P driving windings is that, an excited coil, which produces the P driving magnetomotive forces on the selected core, by reason of the N driving windings which are upon other non-selected cores, produces magnetomotive forces which restrain other cores and minimizes, if it does not prevent altogether, any undesirable magnetic excursions by these non-selected cores. It would accordingly appear desirable to suppress the magnetic excursions of unselected cores and further, wherever possible, to get away from the necessity for exciting a coil in a coil pair where a binary zero is to be represented. In other words, a saving in the costs of circuitry for driving switches as well as in the switch itself can be made by eliminating coil pairs and in their place providing a single coil which is excited or not excited, depending upon the exigencies of the situation.

It is an object of the present invention to provide a magnetic switch of the type described which has a single selecting coil in the place of the double selecting coils shown previously.

It is a further object of the present invention to provide a magnetic switch of the type described having a more economical structure.

It is a still further object of the present invention to provide a novel, simple and improved magnetic switch.

These and further objects of the invention are achieved by providing a magnetic switch wherein a single coil having P or N windings on each core replaces each of the double coils shown in the previous types of switches. An auxiliary coil, hereafter known as a compensating coil, is employed to make use of the information in the selected winding code whereby only the selected core receives sufficient magnetomotive force to be driven to magnetic saturation in an opposite polarity. The other cores of the switch have their magnetic excursions in a P going direction substantially suppressed. The selection of a core is made by selecting, for excitation, the coils which are connected to a desired core only by P going windings. The only additional coil which must be excited is the compensating coil. Thereby, the number of driving tubes required is materially reduced as well as the number of windings which must be placed upon a magnetic core.

Figure 1:
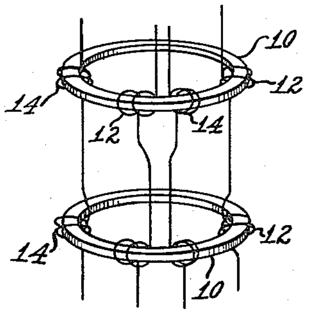
Figure 2:
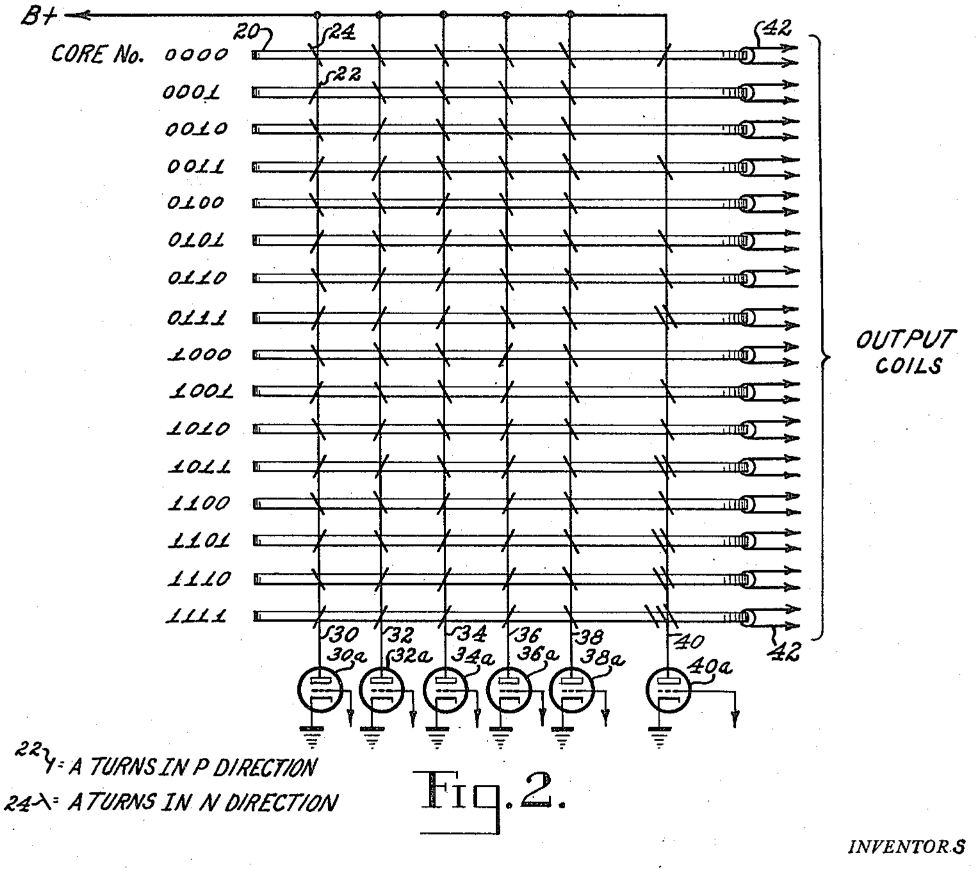
Figure 4:
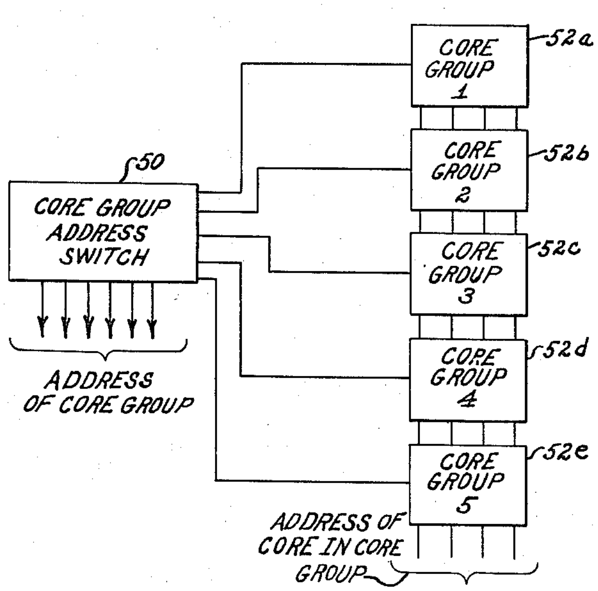
Figure 5:
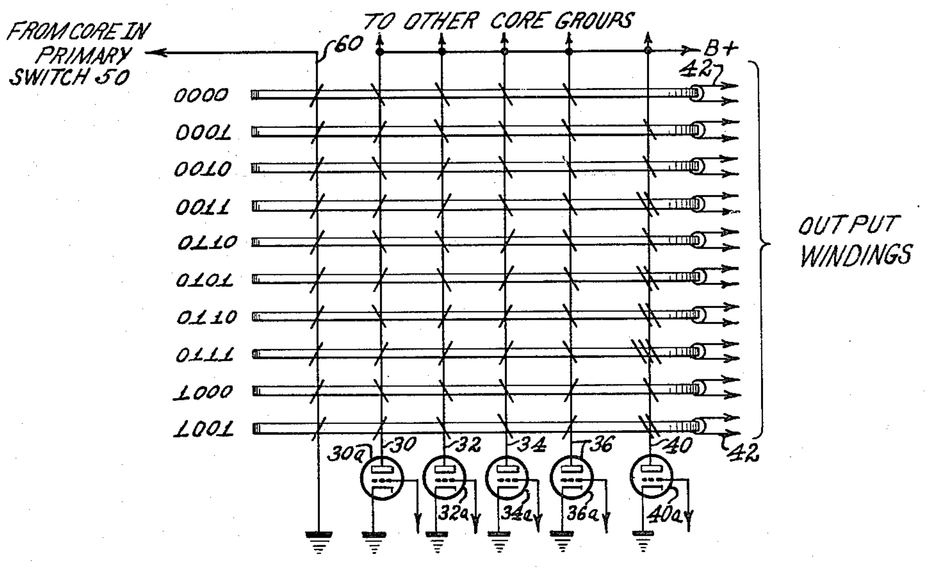
Figure 6:
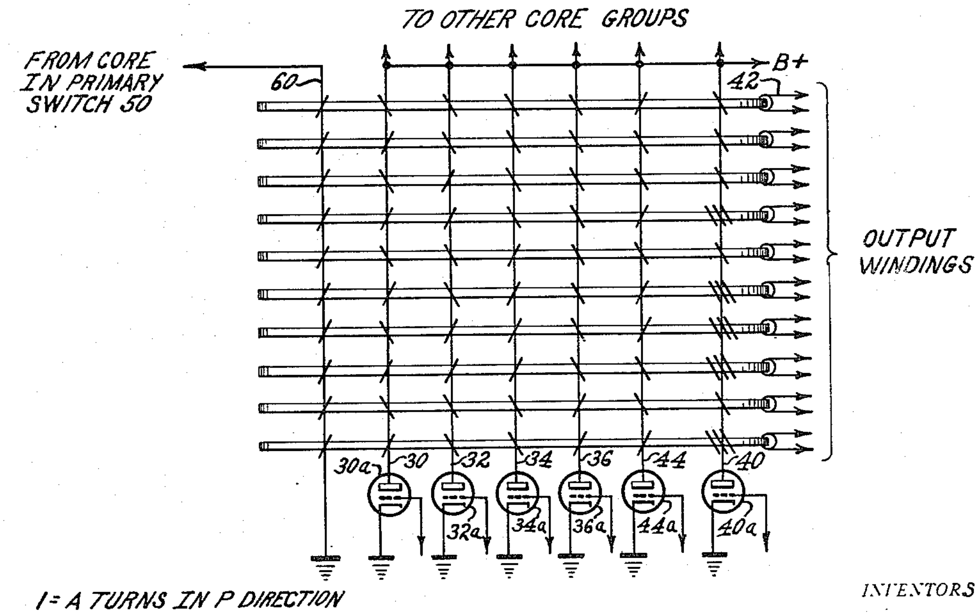

The novel features of the invention, as well as the invention itself, both as to its organization and method of operation, will best be understood from the following description when read in connection with the accompanying drawings, in which Figure 1 is a perspective view of toroidal cores and windings shown for the purpose of facilitating the explanation and simplifying the drawings of the invention, Figure 2 is a schematic drawing of one embodiment of the invention, Figure 3 is a drawing of a second embodiment of the invention which uses a parity code, Figure 4 is a schematic diagram of a type of magnetic switch shown for the purpose of assisting in explaining the embodiment of the invention shown in Figs. 5 and 6, Figure 5 is a schematic diagram of a secondary type of magnetic switch embodying the invention which may be used in conjunction with a primary type of switch, and Figure 6 shows a schematic drawing of a secondary type of switch embodying the invention wherein a parity code is used.

Reference is now made to Figure 1, wherein there may be seen two cores 10. These cores are made of magnetic material having a substantially rectangular hysteresis loop. The shape preferred for the cores is toroidal. However, other suitable shapes may be used and it is not intended to limit the invention by this showing of the preferred embodiment. The cores 10 have windings 12, 14, upon them. These windings, when excited by current, provide magnetomotive forces which tend to drive the cores to saturation at one or the other polarity. The two windings 12 which drive a core in a first direction may have arbitrarily assigned thereto the designation of the "P" windings. The other windings 14 may have the designation of "N" windings. A P winding 12 of one core may be serially connected with an N or a P winding of another core to comprise a coil. When the serially connected windings are all of one sense, the coil is designated as an N or P coil, depending upon the sense of the windings.

For the purpose of maintaining clear the terminology used herein, a coil may be defined as consisting of a number of windings of the same or different sense which are connected in series. Therefore, the windings on each of the cores may be interconnected in series (each winding connected with a different winding on another core) to form a coil. The sense of the winding is to be understood as the direction in which the turns are wound upon a core. Accordingly, windings in a "P" sense have turns wherein a current will cause a magnetomotive force to be generated which will drive or tend to drive the core towards magnetic saturation in a direction P. Windings which are said to have an N sense have turns wherein a current will cause a magnetomotive force to be generated which will drive or tend to drive the core towards magnetic saturation in a direction N.

As was previously described above in the discussion of application Serial No. 275,622, each one of the cores in a switch has a plurality of P and N windings thereon. The cores are usually placed in the same magnetically saturated starting condition, for example, with an N polarity. In order to drive a core to P polarity saturation, a magnetomotive force must be applied to the core which exceeds a critical value. The core which has applied thereto a magnetomotive force in excess of this critical value will be driven to the condition P. All other cores do not receive a magnetomotive force in excess of the required critical value and remain substantially in condition N. Some of these other cores may also receive a magnetizing force in the direction N, but since they are already saturated in the N direction there is substantially no change in their condition. By proper selection of the ratio of turns for the P windings and the N windings it is possible to construct a switch wherein a selected core receives a substantial P magnetomotive force. All other non-selected cores receive either no magnetomotive force at all or else receive a magnetomotive force in the direction N. The method for selection of the turns is described and claimed in the above noted application.

In view of the difficulties entailed in showing the winding turns on each of a large number of cores, a modified representation of the cores and the windings is made in Figures 2, 3, 5 and 6 in order to preserve simplicity in the drawings and to provide a readily understood drawing. The convention adopted for these drawings is that the cores are represented by elongated rectangles such as those designated by the reference numeral 20. The coil windings are represented by the lines 22, 24 that pass at an angle through the rectangle. A line through these angle lines represents the series interconnection of the windings to form coils 30, 40. The angle line which represents the windings may form an obtuse angle to the left or to the right with the cores. If it is an obtuse angle to the left, such as is identified by reference numeral 24, the line represents a winding providing a magnetomotive force in the direction N. If the obtuse angle is to the right, as identified by reference numeral 22, the line represents a winding providing a magnetomotive force in the direction P. More than one line represents a multiple of the turns represented by one line. This will become more clear with the subsequent description.

Reference is now made to Fig. 2 of the drawing, which shows a schematic diagram of an embodiment of the invention. For purposes of explanation, each one of the cores has assigned thereto a binary number and each one of the selecting coils has assigned thereto an order in a binary number. Advantage is taken of the information occurring in the binary code for the purpose of eliminating one of two coils at each binary order position as was required in the previous magnetic switching systems. A compensating coil is provided which serves the purpose of preventing all cores except the selected core from being driven. The magnetic switch shown in Fig. 2 includes a plurality of magnetic cores 20 each of which has wound thereon an individual output coil 42. In order to assure that all the cores are initially in a condition N, an N restore coil 38 is provided. This is coupled to each one of the cores by windings, all of which are wound to have an N sense. To facilitate the explanation of this invention, the cores are numbered from 0000 to 1111 and thus represent all the combinations of digits that occur with binary orders $2^0$, $2'$, $2^2$, $2^3$. Accordingly, four selecting coils 30, 32, 34, 36 are provided. The following table shows the number of each core, the order assignment of the selecting coils, the sense of the selecting coil winding on each core, and the sense of the compensating winding.

In Fig. 2, the correspondence of a winding to a binary order is clear from Table I.

*Table I*

| Coil | 36 | 34 | 32 | 30 | 38 | Compensating 40 |
|---|---|---|---|---|---|---|
| Core No. | $2^3$ | $2^2$ | $2'$ | $2^0$ | N Restore | |
| 0000 | N | N | N | N | N | P |
| 0001 | N | N | N | P | N | ---------- |
| 0010 | N | N | P | N | N | ---------- |
| 0011 | N | N | P | P | N | N |
| 0100 | N | P | N | N | N | ---------- |
| 0101 | N | P | N | P | N | N |
| 0110 | N | P | P | N | N | N |
| 0111 | N | P | P | P | N | 2N |
| 1000 | P | N | N | N | N | ---------- |
| 1001 | P | N | N | P | N | N |
| 1010 | P | N | P | N | N | N |
| 1011 | P | N | P | P | N | 2N |
| 1100 | P | P | N | N | N | N |
| 1101 | P | P | N | P | N | 2N |
| 1110 | P | P | P | N | N | 2N |
| 1111 | P | P | P | P | N | 3N |

The winding code selected is one wherein a "zero" in an order position is represented by an N winding and a "one" in an order position is represented by a P winding. Thus a selecting coil is made up of a series of P and N windings. A coil is excited only when a "one" occurs in its order. Otherwise it is not excited. The compensating coil is always excited. Thus, in addressing a core, anywhere from two to five cores may be excited.

It will be seen that by excitation of the proper selecting coils 30–36 a P drive is applied to a selected core. However, the coil or coils selected also have other P windings and accordingly other P drives will be applied to other cores. To prevent these other cores from being driven, the compensating winding is provided. The number of turns and the sense of the compensating coil windings required to achieve this is shown in the above table.

As previously indicated, only the selecting coils which express the "ones" in the binary number of a desired core are excited. None of the other selecting coils are excited. The compensating winding requirements may be determined by inspection since, looking at core 1111 for example, it will be seen that the selection for excitation of coils $2^0$, $2^1$, $2^2$ and $2^3$ all provide drives in the P direction. The only time that core number 1111 must be driven is when all four coils are simultaneously excited. Accordingly, the compensating coil on this core should neutralize three of the P going selecting coil windings. As another example regarding core 1011, it will be seen that this core receives a drive in the P direction when digit corresponding coils $2^0$, $2^1$, and $2^3$ are excited. Coil number 1011 is selected only when all these three coils are simultaneously excited. Accordingly, two-thirds of the total number of P windings on the core should be neutralized by N windings to maintain core 1011 in its N condition under all circumstances, except when the three coils are excited. Another way for determining the number of compensating coil turns is to consider the excess of P over N going turns on a core when this core is the most significant unselected core. The compensating winding turns on that core is the amount required to cancel the excess P turns. For example, when core 1111 is selected, core 1011 is one of the most significant unselected cores. It has 3 P driving windings and one N driving winding excited. Therefore, its compensating coil winding should have sufficient N turns to neutralize 2 P driving windings. This may also be determined mathematically as follows:

Assume that there are $n$ coils which are inductively coupled to all the cores by windings. Each winding is either in the N or P going direction. Furthermore, these coils are excited only if a one is called for, as described above. It should be noted that, if desired, a similar system may be simply devised in which zeroes operate the switch. Let a particular core have "$m_1$" one digits, and "$m_2$" zero digits, so that $m_1+m_2=m$. Let there be "A" P turns per core for each coil and "B" N turns per core for each coil. Assume that the compensating coil 40 is coupled to each core 20 by windings which are in number, $(m_1-1)A$, and which have a sense in the direction N. Then a selected core will receive a drive of $m_1A-(m_1-1)A=A$ in every case.

The most significant unselected core will receive a drive $m_1A-[(m_1+1)-1]A=0$. By one of the "most significant unselected cores" is meant that one of the cores which receives the next to the maximum P drive from the excited selecting coils, and which core is not the one that is selected. Less significant unselected cores will receive N drives. The switch shown in Fig. 2 has $m=4$ for a P drive of A turns per core. This switch requires $(m+1)A+(m_1-1)A$ winding turns per core, the maximum value of this being $(m+1)A+(m-1)A=2mA$. The normal switch described in application Serial No. 275,622 identified above, requires $m(m+1)A$ winding turns per core for a drive of $mA$.

It should be noted that $(m_1-1)A$, which is the number of turns required for the compensating coil winding on each core, does equal zero on a number of cores and provides a negative result for core number 0000. Accordingly, no windings are found on the cores where this equals zero and on the 0000 core there are windings in a P going direction. Accordingly, if the zero core is selected, the only coil which is excited is the compensating coil.

It will be appreciated that this magnetic switch, which may be termed a single ended magnetic switch, has half the number of tubes plus one which the previous switch types had so that the actual tube addressing and driving circuits required is decreased and the external circuits are considerably simplified. Fewer tubes of course means a saving in power.

As may be seen in Fig. 2, each of the coils serves as a plate load for an associated driving vacuum tube 30a–40a. Selection is made by applying the proper addressing signals to the grids of tubes 30a–36a having the desired selecting coils 30–36 as their plate loads and simultaneously exciting the tube 40a which has the compensating coil 40 as its plate load. When a selected core turns over, it induces a voltage in its output coil 42, thus indicating that the selection has occurred. This voltage may be utilized in any desired manner. The N restore coil 38 has a tube 38a to which it is connected as a plate load. This coil is driven by means of the tube 38a whenever it is desired to restore the switch. The vacuum tubes are exemplary of switching means for selectively exciting the coils. Other suitable switching means such as magnetic or mechanical switches may be used. The cores of this switch need not be driven all the way into saturation in the opposite polarity, but may only be driven partly towards saturation. The only requirement is that sufficient drive be provided to induce a voltage sufficiently indicative of selection in the output coil. The switching system shown uses $n+1$ coils in order to select one out of $2^n$ cores as opposed to previous systems which use $2n$ coils for the same selection.

Reference is now made to Fig. 3 which shows an embodiment of the invention wherein the binary code and a parity check is used. The parity check system is fully described in an article by Hamming in the Bell System Technical Journal, vol. 29, April 1950, "Error and Error Correcting Codes." A binary digit may be represented by the presence or absence of a pulse. A binary number transmission may either be serial, as a train of pulses wherein the various positions in the order of the binary number are separated in time, or parallel, wherein a number of parallel transmission channels are used, thus providing an actual physical separation of the various orders in the binary number. When a binary code is combined with a parity system, an extra track or an extra interval is allowed wherein a "one" or a "zero" is added to a number in order to assure that the sum of the binary number "ones" are always an odd number. A method is provided whereby, during subsequent handling of the number, merely by adding all the "ones" in the number to see if the sum is odd a check may be had upon the correctness of the transmission of the number. Of course, this check will only pick up an odd number of errors occurring in the transmission of the number. Any even number of errors which occur are undetected. However, the parity check has been found to be an extremely efficient checking system and has found widespread use. If it is desired, the parity check may be made even instead of odd merely by adding or not adding a one to a number so that the total number of "ones" is always even.

In Fig. 3 there is shown a schematic diagram of a "single-ended" type of switch which uses a binary input to express the numbers assigned to each one of the cores in the same manner as is shown in Fig. 2. In addition, another coil—a parity coil 44—is provided which is excited or is not excited, depending upon whether or not the binary number assumes a parity digit. A compensation coil 40 is also provided and the logic determining the number of turns and the directions of the turns for the windings of this coil on each of the cores is still the same as was indicated previously. Assuming an odd parity, i. e., it is desired that the number of ones in a binary number always equal an odd number and further assuming the same convention as previously assumed, namely that a P winding 22 on a core 20 represents a one, and an N winding 24 on a core represents a zero, and that the parity coil 44 has a P winding on a core whereever a one is required to be added, and an N winding on a core wherever a one is not required to be added, a winding table for this type of switch will be as follows:

In Fig. 3, the correspondence of a winding to a binary order is clear from Table II, as in Fig. 2 the order is clear from Table I.

*Table II*

| Coil | 36 | 34 | 32 | 30 | 44 | N Restore 38 | Compensating 40 |
|---|---|---|---|---|---|---|---|
| Core No. | $2^3$ | $2^2$ | $2'$ | $2^0$ | Parity | | |
| 0000 | N | N | N | N | P | 2N | P |
| 0001 | N | N | N | P | N | 2N | P |
| 0010 | N | N | P | N | N | 2N | P |
| 0011 | N | N | P | P | P | 2N | N |
| 0100 | N | P | N | N | N | 2N | P |
| 0101 | N | P | N | P | P | 2N | N |
| 0110 | N | P | P | N | P | 2N | N |
| 0111 | N | P | P | P | N | 2N | N |
| 1000 | P | N | N | N | N | 2N | P |
| 1001 | P | N | N | P | P | 2N | N |
| 1010 | P | N | P | N | P | 2N | N |
| 1011 | P | N | P | P | N | 2N | N |
| 1100 | P | P | N | N | P | 2N | N |
| 1101 | P | P | N | P | N | 2N | N |
| 1110 | P | P | P | N | N | 2N | N |
| 1111 | P | P | P | P | P | 2N | 3N |

To determine the number of compensating coil windings required, by inspection, and using the logic previously indicated, it is just necessary to find the excess of P over N going turns on a core when this core is one of the most significant unselected cores. Then the number of compensating coil winding turns is chosen to cancel the excess. As an illustration, looking at core 1010, it will be seen that that core has three P going windings which are simultaneously excited only when binary digit coils $2'$ and $2^3$ are excited, and, since an odd parity convention is assumed, when the parity coil is excited. When core 1010 is the most significant unselected core, in addition to the above P going windings two N going windings are excited (selection of core 1111 or 1011 or 1110.) Accordingly, the compensating coil winding requires one N going winding to cancel the excess one P going winding. Thus the P going drive on a selected core is twice that received by a selected core in the switch shown in Figure 2. The reason that the drive on each core which is selected is twice the drive of the selected core in the case of the switch shown in Figure 2 is that the additional redundancy provided by the use of the parity coil enables this condition to arise. This may be shown mathematically as follows:

Assume that the output from any one core is $2A$ when that core is selected. Consider that a core which is selected has a total of $m_1$ "ones" in its equivalent binary number including the parity digit. If the compensation winding has C turns in an N direction on such a core, then let the number of turns $C=(m_1-2)A$. The most significant unselected cores have their equivalent numbers differing by one digit, and if this is so, not only will they differ by one digit in the information part of the number, but also in the parity digit. Therefore, these cores must differ either by two more ones or two less ones in the number. Hence, the most significant unselected core will provide an output of $$m_1A-\{(m_1+2)-2\}A=0$$

The less significant cores will have negative results.

In the switch shown in Fig. 3, the N restore coil 38 must have $2A$ turns in the N direction of each core in order to insure proper resetting. Thus, for a drive of $2A$, the maximum number of turns required is $2(m+1)A$. This switch is therefore nearly twice as efficient as the previous switch, as very nearly the same number of turns are required for twice the drive.

As previously shown, each coil 30–44 in the switch has its own driving tube 30a–44a for which the coil serves as the plate load. Each core may be selected by addressing the proper coils which express the binary number of the core. The parity coil is excited or is not excited in accordance with the requirements of the binary number. The compensating coil is always excited whenever a core selection is made. The N restore coil is excited for the purpose of restoring the switch to a starting condition. For selecting the 0000 core both parity and compensating coil are excited. The switches as shown may also be made employing a binary coded decimal winding code for the selecting coils. This also provides an efficient switch with a reduced number of turns.

Reference is now made to Fig. 4. This is a schematic of an invention which is described in detail and claimed in application Serial No. 327,234, filed December 22, 1952, by Jan A. Rajchman and assigned to this assignee. The type of switch which is shown therein comprises a primary magnetic switch 50 which may, for example, be of the type shown in Figs. 2 or 3 herein, and is designated as a core group address switch. Any one of the cores in this primary switch may be selected by applying signals to its selecting coils via the core group address input in the same manner as has been described previously. Each one of the cores in the primary switch has its output coil connected to a different group of cores 52*a*, *b*, *c*, *d*, *e* in such a manner that when one of the cores of the primary switch is driven from N to P, a P driving magnetomotive force is applied to all of the cores in the particular core group to which it is coupled. A second input is applied to all of the cores in all of the core groups via the coil in core address input. This second input is in the nature of an inhibiting input and inhibits all the cores but a selected core in each of the groups of cores. This selected core is the only one which is capable of being driven from N to P. However, the only one of the selected cores which is actually so driven is the one in the core group which receives a P drive from the primary switch. Restoration of the cores of the core group to condition N is made by restoring the cores in the primary switch. For details one is referred to the application Serial No. 327,324 noted above.

In the magnetic switches, which are shown in the prior application, the "double-ended" or paired type of selecting coils are used. The inventive principles using the compensating coil in a switch may also be applied to advantage to the secondary switch. Obviously, the principle explained thus far may be applied for selecting a core in the primary switch.

Referring now to Fig. 5, there is shown a secondary switch, embodying the invention which represents any one of the groups of cores 92*a*–92*e*. Each one of the cores in this group receives a magnetomotive force in a P going direction from the output coil of one of the cores on a primary switch. The P driving coil is indicated by the coil 60 at the left side of the cores. The winding code used for the coil couplings is the binary code and by comparing the coil windings, both in direction and number, with the selecting coil windings shown in Fig. 2, it will be seen that they are identical. The distinction which occurs, however, between the switching system of Fig. 5 and the system of Fig. 2 is in the number of turns and the direction of the turns required for the compensation winding.

It will be remembered that this secondary switch has a P drive applied to all the cores coupled to a selected primary switch core. Furthermore, all the cores in the group except a desired one must be inhibited. The P drive from the primary switch turns over the selected core and not the P drive from the secondary switch selecting coils, as is the case with the primary types of switches. Accordingly, the turns and the direction of these turns of the compensating winding 40 must be selected so that the P drives from the selecting coils is nullified in every case. Regarding the selecting core, 0001 for example, since the selecting coils 30 through 36 provide only one P drive, the turns in the compensating coil winding on that core will be equal and opposite. Consider as another example core number 110. This core has two P going windings and these are balanced or nullified by two N going windings in the compensating coil. When core number 110 is selected, only the 2′ and $2^2$ coils, which are representative of 110, are excited, together with the compensating coil. The compensating coil will balance the P drive of the selecting coils and if the core group has been selected by the primary switch then core number 110 will be turned over. Obviously, if the core group has not been selected by the primary switch, then core number 110 receives no P drive and is not turned over despite excitation of its selecting and compensating coils. The number of turns on the compensating winding on each core, instead of being $(m_1-1)A$ as before, is chosen as $m_1A$. In the case of the non-selected cores, the total drive is negative. In the case of core No. 0000, since all the selecting coil windings are N going there are no P windings requiring cancellation. Hence, the compensating coil has no winding turns on this core.

Conceivably, a secondary switch may be designed wherein the inhibiting input or input to the secondary switches including parity information. Such a switch is shown in Fig. 6. The code pattern of the selecting windings and the parity winding upon the cores is the same as that shown in Fig. 2. The difference between the switches is again in the number of windings required for the compensating coil 40. The function of the compensating winding hereto is to cancel all the P drives on the selected core, permitting a P drive to occur only from the primary switch. Of course the non-selected cores must have some negative drive so that they remain non-selected. Accordingly, the compensating winding will have a number of turns on each core in an N going direction which are equal to the total number of turns on each core which are in a P going direction, exclusive of the coupling from the primary switch. As an illustration, the core number 110 has three primary turn P going windings. Therefore, the compensating winding will have three N going turn windings. Expressed mathematically, if A is the number of P turns in each coil and $m_1$ is the toal number of ones in each core, including the parity one, then the required number of turns for the compensating coil winding on each core is $m_1A_1$. It will be seen that the drive on the most non-selected core is zero and in all the other cores is negative. It is to be noted that the secondary switches do not have any N restore windings in view of the fact that the N restoration is provided by the primary switch being restored.

Although not shown, binary coded decimal coding may be used for determining the winding sense of the selecting coils in accordance with the procedure set forth in the embodiments of the invention. Redundant codes, such as "two out of five" codes are particularly applicable to the use of single ended coils for magnetic switches. The general principle is that if one has five information digits or orders, and each code (term in the code) contains only two one digits, then there are only ten possible unique combinations so that each term in the code is individually defined.

Accordingly, there has been shown and described above a novel, useful, simple and inexpensive construction for a magnetic switch. The single ended construction permits a substantial reduction in the number of driving tubes required and attendant circuitry. It is to be understood that although the coding shown herein is binary, other suitable types of codes may be employed, the only requirement being that these codes have meaningful redundant information which may be made the function of the compensating coil, thus to enable the operation of such a switch. The number of cores shown in the switches herein are exemplary and are not to be construed as a limitation on the switch size.

What is claimed is:

1. A magnetic commutator switch comprising a plurality of magnetic cores, coil means to establish all of said cores with a magnetic saturation having one polarity, and means to selectively drive a desired core toward magnetic saturation in an opposite polarity, said last named means including a plurality of selecting coils, all but one of said coils being inductively coupled to all said cores by a different winding on each core, the sense of the windings being determined in accordance with a desired binary code, said one of said selecting coils being inductively coupled to said cores by windings, the sense and number of turns of the windings of said one coil upon each core being determined in accordance with the number of windings of one of said senses on each core required to permit only one of said plurality of magnetic cores to be driven toward said magnetic saturation upon selective excitation of said selecting coils and said one selecting coil.

2. A magnetic commutator switch as recited in claim 1 wherein the number of winding turns of said one coil required upon each core is the excess of excited winding turns of one sense over the excited winding turns of the other sense which tend to drive that core to saturation in said opposite polarity when, next to a desired selected core, it receives the maximum drive from said all but one selecting coils.

3. A magnetic commutator switch as recited in claim 1 wherein said means to selectively drive a desired core toward magnetic saturation in an opposite polarity includes a coil coupled to all of the cores by windings having the same sense and the number of winding turns of said one coil required upon each core is the excess of excited winding turns of one sense over the excited winding turns of the other sense on a core which tend to drive that core to saturation in said opposite polarity when it receives the maximum drive from said all but one selecting coils.

4. A magnetic commutator switch as recited in claim 1 wherein one of said all but one coils is coupled to said cores in accordance with a parity code, the windings of said parity code coupled coil having one sense on a core where a parity digit is required and the opposite sense on a core where a parity digit is not required.

5. A magnetic switch comprising a plurality of cores of magnetic material, each core corresponding to a different number, a plurality of selecting coils, each coil corresponding to an order in a number system, the number of said selecting coils being determined by the number of corresponding orders required to define all said core corresponding numbers, each of said selecting coils being inductively coupled to all of said cores by series connected windings, a winding being wound in one sense on a core when the order to which the coil including said winding corresponds is required to express the number to which said core corresponds and a winding being wound in the other sense when the order to which the coil including said winding corresponds is not required to express said core corresponding number, a compensating coil, said compensating coil being inductively coupled to said cores by windings, means to apply currents selectively to said selecting coils together with said compensating coil to selectively drive from magnetic saturation in one polarity toward saturation in the opposite polarity a desired one of said cores having a corresponding number which is equalled by the digits in each corresponding order of the selected selecting coils, the ones of said cores to which said compensating coil is coupled and the sense of the windings of said compensating coil being determined by the offset required to nullify the magnetomotive drive applied to a non-selected core when a desired core is selected and driven toward saturation in said opposite polarity, and a plurality of output coils, each of which is inductively coupled to a different one of said cores.

6. A magnetic switch as recited in claim 5 wherein all of said selecting coils are inductively coupled to a core corresponding to the lowest of said numbers by windings which are of said other sense, and said compensating coil is coupled to said core by windings which are of said one sense.

7. A magnetic switch as recited in claim 5 wherein said core corresponding numbers are in the binary system, said coil corresponding orders are for said core corresponding numbers, and there is included a restoring coil inductively coupled to all of said cores by series connected windings having said other sense.

8. A magnetic switch as recited in claim 5 wherein the number of turns of the compensating coil windings upon a core equals $(m_1-1)A$ where $m_1$ is the total number of said coil corresponding one digits required to express said core corresponding number, and A is the number of turns in a selecting coil winding having said one sense.

9. A magnetic switch comprising a number "$n$" of cores of magnetic material, each of said cores having a different number corresponding thereto, a number "$m$" of selecting coils, where $n=2^m$, each of said selecting coils corresponding to an order in said core numbers, each of said core numbers including $m_1$ "one" digits and $m_0$ "zero" digits in said number system, so that $m_1+m_2=m$, each of said selecting coils being inductively coupled to all of said cores by series connected windings, a winding being wound in one sense and having A turns on a core when a "one" digit is required in the order of the selecting coil including said winding to express said core corresponding number, a winding being wound in the opposite sense and having B turns on a core when a "zero" digit is required in the order of the selecting coil including said winding to express said core corresponding number, the number of windings on a core in said one direction being equal to $m_1$A, the number of windings on a core in said opposite direction being equal to $m_2$B, a compensating coil, said compensating coil being inductively coupled to each of said cores by windings connected in series, each of said compensating coil windings having an opposite sense and having its number of turns on a core determined by $(m_1-1)A$, and means to apply currents selectively to said selecting coils together with said compensating coil to selectively drive from saturation in one polarity to saturation in the opposite polarity a desired one of said cores having a corresponding number which is represented by "ones" in the orders of the excited selecting coils.

10. A magnetic switch comprising a plurality of cores of magnetic material, each core corresponding to a different number, a plurality of selecting coils, each coil corresponding to an order in a binary number system, the number of said selecting coils being determined by the number of binary orders required to express all the numbers of said cores, each of said selecting coils being inductively coupled to all of said cores by series connected windings, a winding being wound in one sense on a core when a "one" is required in the order to which the selecting coil including said winding corresponds, to express said core number, and a winding being wound in the opposite sense when a "zero" is required in the order to which the selecting coil including said winding corresponds to express said core number, a parity coil inductively coupled to all of said cores by series connected windings, the winding of said parity coil on a core having said one sense where a parity digit is required for the binary number equivalent to said core number and having said opposite sense where a parity digit is not required, a compensating coil winding, means to apply currents selectively to said selecting coils, and said parity coil together with said compensating coil to selectively drive from magnetic saturation in one polarity toward saturation in the opposite polarity a desired one of said cores having a corresponding number which is equalled by the binary number of the selected selecting coils, said compensating coil winding being inductively coupled by windings to said magnetic cores, the sense and the number of turns of the compensating coil windings on each core being determined by the offset required to nullify the magnetomotive force applied to a most significant non-selected core by excited coils when a desired core is selected and driven toward saturation in said opposite polarity, and a plurality of output coils each of which is coupled to a different one of said cores.

11. A magnetic switch as recited in claim 10 wherein there is included a restoring coil inductively coupled to all of said cores by series connected windings each of which has said opposite sense.

12. A magnetic switch as recited in claim 10 wherein the number of turns of the compensating coil windings upon a core equals $(m_1-2)A$ where $m_1$ is the total number of "ones" in a binary number required to express the core corresponding number and A is the number of turns in a selecting coil winding having said one sense.

13. In a magnetic switch of the type including a group of cores, means to apply a magnetomotive force simultaneously to all the cores of said group to provide a drive from magnetic saturation in one polarity to magnetic saturation in the opposite polarity, and means to inhibit all but a desired one of said core groups from being driven, the improvement in said inhibiting means comprising, a plurality of selecting coils, each of said coils including a different winding on each of the cores which is connected in series, each coil being associated with a different order in the binary system, each core in said group being associated with a different number, each of said selecting coil windings having one sense on a core wherein the order of the coil including the winding is required to express a binary one in the equivalent core number and having the opposite sense on a core wherein the order of the coil including the winding is required to express a binary zero in the equivalent core number, a compensating coil inductively coupled to said cores by windings, means to apply currents selectively to said selecting coils and said compensating coil to permit to be driven to a desired polarity of magnetic saturation only the one of said cores having a number which is equalled by the digits represented by the windings in the selected selecting coils, the sense and the number of turns of said compensating coil winding upon a core being equal and opposite to the total number of turns of all the selecting coil windings in said one sense upon said core, and a plurality of output windings, a different one being coupled to a different one of said cores.

14. In a magnetic switch of the type including a group of cores, means to apply a magnetomotive force simultaneously to all the cores of said group to provide a drive from magnetic saturation in one polarity to magnetic saturation in the opposite polarity, and means to inhibit all but a desired one of said core groups from being driven, the improvement in said inhibiting means comprising a plurality of selecting coils, each of said coils including a different winding on each of said cores which is connected in series, each coil being associated with a different order in the binary system, each core in said group being associated with a different number, each of said selecting coil windings having one sense on a core wherein the order of the coil including the winding is required to express a binary one in the core number, and having the opposite sense on a core wherein the order of the coil including the winding is required to express a binary zero in the equivalent core number, a parity coil inductively coupled to each of said cores by a different winding, said parity coil winding on a core having said one sense where a parity digit is required for the binary number equivalent of said core number and having said opposite sense where a parity digit is not required, a compensating coil inductively coupled to said cores by windings, the sense and number of turns of said compensating coil windings being opposite and equal to the sense and total number of turns of all the selecting coil and parity windings in said one sense on said core, means to apply currents selectively to said selecting coils and said parity coil together with said compensating coil to selectively permit to be driven to a desired polarity of magnetic saturation only the one of said cores having a corresponding number which is equalled by the digits corresponding to the selected selecting coils, and a plurality of output coils, each being coupled to a different one of the cores in said group.

No references cited.